United States Patent
Usami

[19]

[11] Patent Number: 6,138,062
[45] Date of Patent: *Oct. 24, 2000

[54] AUTOMATIC TRAVEL CONTROLLING DEVICE

[75] Inventor: Masayuki Usami, Susono, Japan

[73] Assignee: Toyota Jidoshia Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/887,335

[22] Filed: Jul. 2, 1997

[30] Foreign Application Priority Data

Jul. 15, 1996 [JP] Japan .................................. 8-184988

[51] Int. Cl.$^7$ ............................. G01C 22/00; G05D 1/00
[52] U.S. Cl. ................................. 701/23; 701/41; 701/28; 180/168; 180/169; 318/587; 348/116; 348/119
[58] Field of Search ................................ 701/23, 24, 25, 701/27, 208, 36, 41, 117, 300, 26, 28, 301; 180/168, 169; 318/587; 348/116, 119; 340/436, 438, 439; 356/3.01, 3.1, 5.01

[56] References Cited

U.S. PATENT DOCUMENTS

| | | | |
|---|---|---|---|
| 4,626,995 | 12/1986 | Lofgren et al. | 701/24 |
| 4,819,169 | 4/1989 | Saitoh et al. | 701/28 |
| 5,208,750 | 5/1993 | Kurami et al. | 701/23 |
| 5,220,508 | 6/1993 | Ninomiya et al. | 701/207 |
| 5,351,044 | 9/1994 | Mathur et al. | 340/901 |
| 5,357,432 | 10/1994 | Margolis et al. | 701/23 |
| 5,367,457 | 11/1994 | Ishida | 701/223 |
| 5,390,118 | 2/1995 | Margolis et al. | 701/23 |
| 5,483,453 | 1/1996 | Uemura et al. | 701/205 |
| 5,675,489 | 10/1997 | Pomerleau | 701/28 |
| 5,684,697 | 11/1997 | Mullen | 701/28 |
| 5,765,116 | 6/1998 | Wilson-Jones et al. | 701/41 |
| 5,777,451 | 7/1998 | Kobayashi et al. | 701/23 |
| 5,815,825 | 9/1998 | Tachibana et al. | 701/23 |
| 5,850,193 | 12/1998 | Shimoura et al. | 701/210 |
| 5,875,408 | 2/1999 | Bendett et al. | 701/300 |
| 5,938,707 | 8/1999 | Uchara | 701/41 |

FOREIGN PATENT DOCUMENTS

| | | |
|---|---|---|
| 1-314672 | 12/1989 | Japan . |
| 7-244717 | 9/1995 | Japan . |
| 8-005388 | 1/1996 | Japan . |
| 8-016242 | 1/1996 | Japan . |

*Primary Examiner*—Jacques H. Louis-Jacques
*Attorney, Agent, or Firm*—Pillsbury Madison & Sutro LLP

[57] ABSTRACT

An automatic travel controlling device capable of reliably guiding a vehicle along a lane even if the white lane lines cannot be detected. A laser radar device for detecting the distance to a side wall of the lane is provided to the left and right in addition to a CCD camera for detecting the white lane lines. An image from the CCD camera is supplied to a image processor ECU, and an extracted white line is supplied to a vehicle controlling ECU. A vehicle controlling ECU drives a steering actuator to perform steering control based on two white lines of the lane when detected. However, when the white lines cannot be detected, steering control based on the distances to the side walls is performed. If an obstacle is detected ahead by the laser radar device, the vehicle position is detected based on the distances to the side walls and a lane change is performed to evade the obstacle.

4 Claims, 7 Drawing Sheets

AUTOMATIC TRAVEL CONTROLLING DEVICE

BACKGROUND OF THE INVENTION

1. Field of the Invention

The present invention relates to an automatic travel controlling device and particularly to a device for guiding vehicles along lanes provided with lane lines, having a color such as white, and with side walls.

2. Description of the Prior Art

Heretofore, travel controlling systems have been developed with an object to reduce driving operations by the vehicle driver and to further improve safety.

For example, Japanese Patent Laid-Open Publication No. Hei 7-244717 discloses a technique for photographing lanes, such as with a CCD camera, and detecting lane lines from the obtained image, and based on the lane line positions detected in this manner, enables the control of the vehicle travel, particularly steering.

However, the difficulty of reliably detecting lane lines using the above-mentioned prior art was a problem because actual lanes have white lines which may be discontinuous or faint.

Even for lanes in which the white lines are not faint, there was a problem where the two lane lines could not be detected and the vehicle position also could not be detected, such as when the vehicle performs a course change, since the lane lines move outside the photographic range due to the camera's angle of view being fixed. Of course, in principle, the vehicle position can be determined as long as one of the two white lines defining a lane can be photographed. However, in practice, the vehicle position cannot be accurately detected due to fluctuations of the lane line positions within the image caused by pitching of the vehicle. (In comparison, if the two lane lines are detected, a center position between both lines becomes the center of the lane so that the vehicle position can be determined even under the influence of pitching.)

SUMMARY OF THE INVENTION

It is an object of the present invention to provide a device capable of controlling the travel of a vehicle in a stable manner, even in situations where the white lane lines are discontinuous or faint and cannot be detected, or where the white lane lines cannot be detected because the vehicle is performing a lane change.

In order to achieve the above-mentioned object, an automatic travel controlling device of this invention comprises: first detecting means for detecting the vehicle position by detecting lane lines; second detecting means for detecting the vehicle position by detecting the distance to a side wall of a road; evaluating means for evaluating the detection accuracy of the first detecting means; and controlling means for switching and executing, based on the detection accuracy of the first detecting means, steering control based on the vehicle position that was detected by the first detecting means and steering control based on the vehicle position that was detected by the second detecting means. By switching and executing the two control methods, travel control can be maintained in a stable manner by one control method even if the other control method becomes inoperable.

The above-mentioned controlling means executes steering control based on the vehicle position detected by the second detecting means when the detection accuracy of the first detecting means is lower than a predetermined value. Even if the lane lines are discontinuous or faint and the detection accuracy of the first detecting means is low, steering control based on the detection result of the second detecting means is executed so as to enable stable travel control.

The above-mentioned first detecting means includes photographing means for photographing the road ahead of the vehicle, and the evaluating means evaluates the above-mentioned detection accuracy based on the image of the lane lines within the road image that was output from the photographing means.

The above-mentioned evaluating means estimates the future detection accuracy based on the future travel path of the vehicle. This future travel path is, for example, a travel path accompanying a lane change of the vehicle. The above-mentioned evaluating means estimates the future detection accuracy lower than a predetermined value, and the above-mentioned controlling means executes steering control based on the vehicle position that was detected by the above-mentioned second detecting means when the above-mentioned future detection accuracy is lower than the predetermined value. This prevents control delays and the steering control can be quickly transferred from that based on the detection result of the first detecting means to that based on the detection result of the second detecting means.

The above-mentioned controlling means executes steering control based on the vehicle position that was detected by the above-mentioned first detecting means when the detection accuracy by the above-mentioned evaluating means subsequent to the start of a lane change returns to the detection accuracy prior to the lane change.

Furthermore, the automatic travel controlling device of the present invention includes a camera for photographing the road ahead of the vehicle, an image processor for detecting lane lines from an image obtained from the above-mentioned camera, a radar for detecting a side wall of the road, and a controlling device for switching and executing steering control based on the above-mentioned lane lines and steering control based on the above-mentioned side wall of the road.

The above-mentioned controlling device executes steering control based on the above-mentioned side wall of the road when neither of the two above-mentioned lane lines can be detected by the above-mentioned image processor.

The above-mentioned controlling device executes steering control based on the above-mentioned side wall of the road during lane changes. Since it generally becomes impossible to detect the lane lines during lane changes, steering control is transferred to that based on the side wall of the road so as to enable stable travel control.

The above-mentioned controlling device executes steering control based on the above-mentioned side wall of the road during evasion of obstacles. Since generally it also becomes difficult to detect the lane lines during evasion of obstacles, steering control is transferred to that based on the side wall of the road so as to enable stable travel control.

DETAILED DESCRIPTION OF THE PREFERRED EMBODIMENTS

An embodiment of the present invention is described in the following with reference to the drawings.

Figure 1:
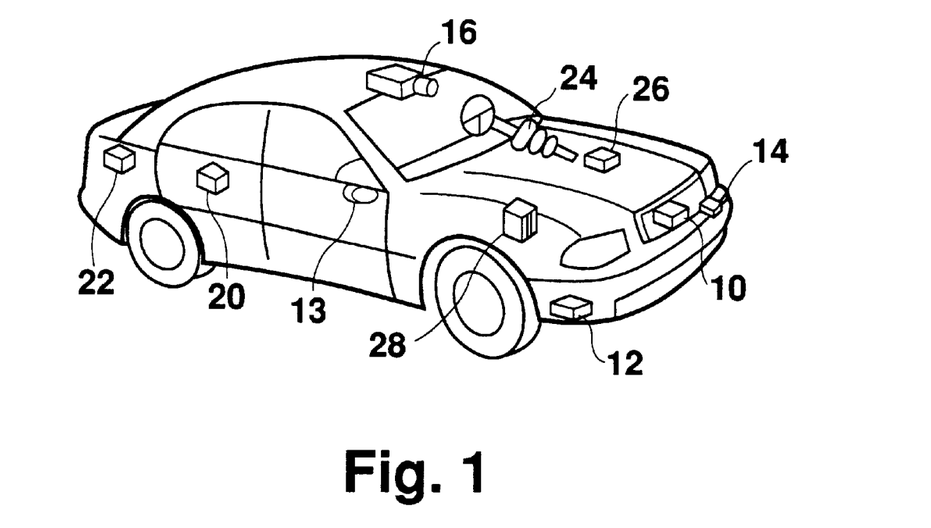
FIG. 1 illustrates the structure of an embodiment of this invention.
Figure 2:
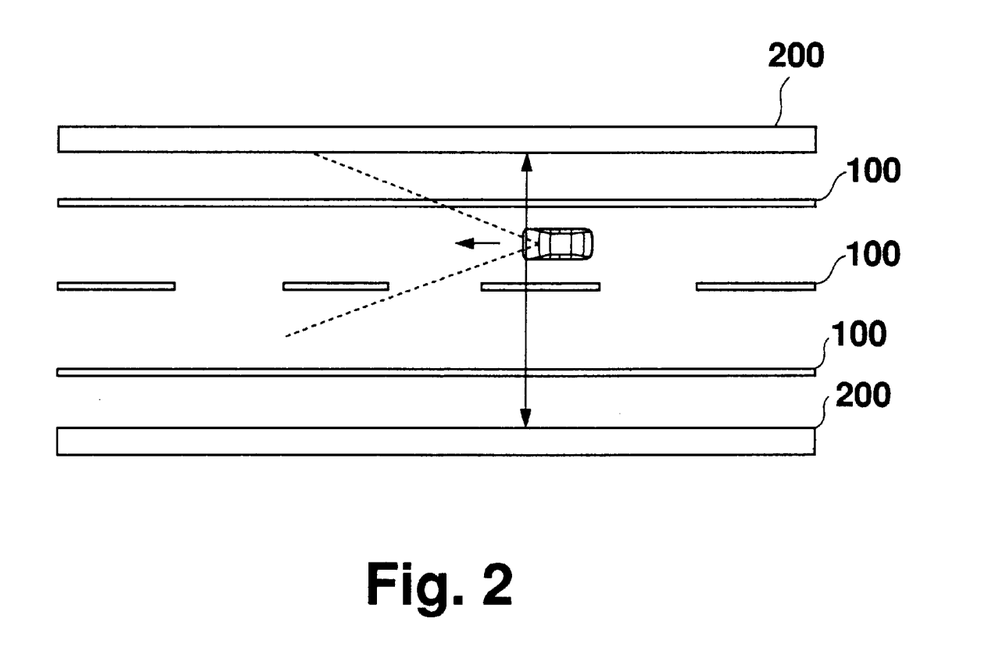
FIG. 2 is a top view of a road having side walls.

FIG. 1 shows a structure of a vehicle of this embodiment and FIG. 2 shows travel lanes on which the vehicle travels, having side walls. FIG. 2 shows lane lines 100 and left and right side walls 200. The front part of the vehicle is provided with a laser radar device 10 for forward obstacle detection and side-wall (side) laser radar devices 12, 14 for detecting the distances to the side walls of the lanes. Laser radar device 10 scans the lane ahead and detects the distance and angle to an obstacle. Laser radar devices 12, 14 detect the distances to the left and right side walls of the lanes.

The detected obstacle data and distance to side wall data are supplied to a vehicle controlling ECU (electronic control device) 20. Besides emitting a laser beam perpendicular to the direction of travel of the vehicle and detecting the distances to the side walls at the immediate sides of the vehicle, laser radar devices 12, 14 may emit the laser beam in a forward direction that is oblique to the direction of travel of the vehicle and detect the distances to the side walls at a predetermined forward distance. Further, the radar devices need not emit a single beam but may emit multiple beams.

Furthermore, the roof of the vehicle is provided with a front-view CCD camera 16 for photographing the lane ahead and the door mirror is provided with a rear-view CCD camera 18 for photographing the lane on the side and to the rear (adjacent lane). The image data obtained from these cameras is supplied to an image processor ECU 22 in the rear part of the vehicle (for example in the trunk). Image processor ECU 22 processes image data from front-view CCD camera 16, extracts lane line data, and supplies its position data to a vehicle controlling ECU 20, as well as processes image data from rear-view CCD camera 18, and extracts approaching vehicle data for supply to the vehicle controlling ECU 20. In order to extract lane line data, the obtained image may be converted to binary and matching with a lane line template or edge extraction may be performed, and in order to extract the approaching vehicle, a specific optical flow (movement vector calculated from differences in temporally continuous images) may be extracted from the obtained image. Vehicle controlling ECU 20, which receives as inputs lane line data and distance to side wall data, detects the vehicle position within a lane based on the data and drives a steering actuator 24 to perform the required travel along the lane, as well as deciding whether to change lanes (or travel evasively) or stop based on obstacle data and rear and side approaching vehicle data, and controls those steering actuator 24, a throttle actuator 26, and a brake actuator 28.

In this manner, this embodiment does not simply detect the lane line position to control the travel of the vehicle, but is capable of reliably controlling the vehicle even under conditions where the lane line data cannot be extracted since travel is controlled according to the two physical quantities of lane line position and distances to the side walls.

A concrete process of this embodiment is described in the following with reference to flowcharts.

Figure 3:
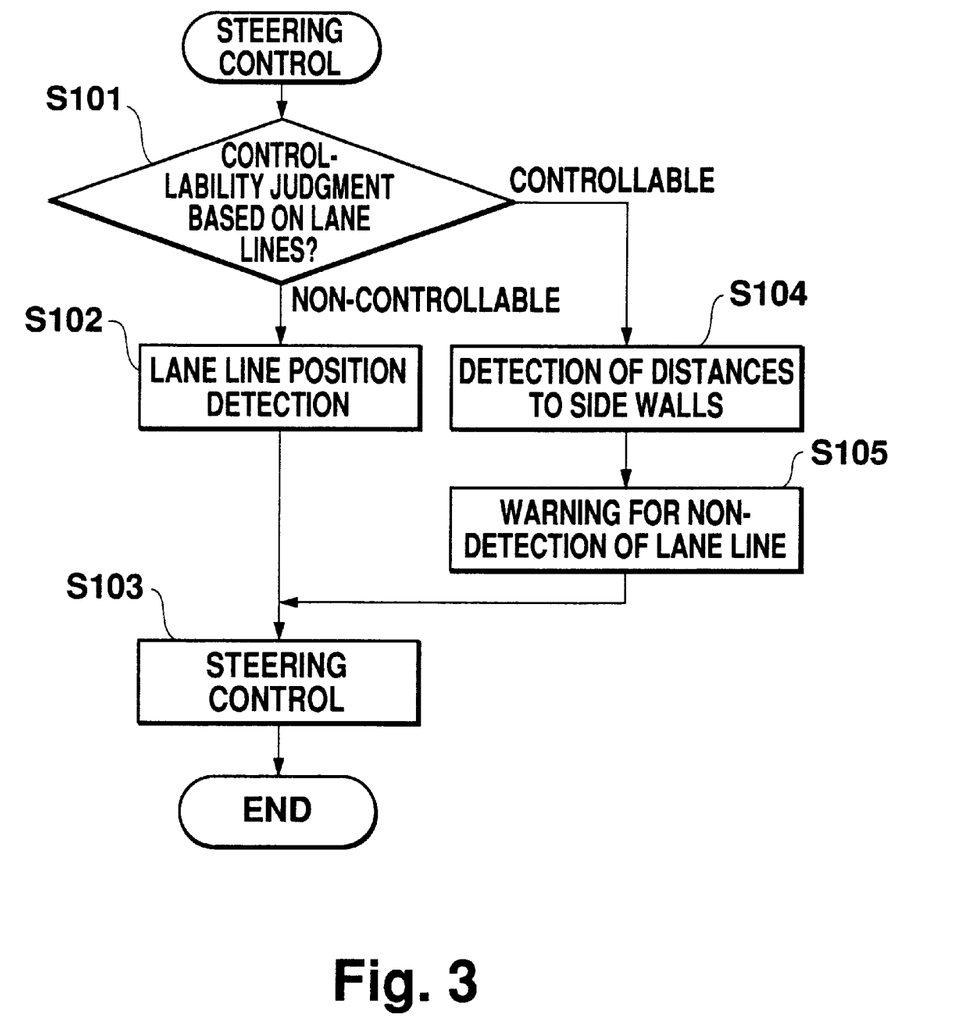
FIG. 3 is a overall process flowchart for steering control.

FIG. 3 shows an overall process flowchart. First, the vehicle controlling ECU 20 judges whether or not lane line based control is possible (S101). This judgment is based on whether or not the lane lines can be accurately detected, the details of which will be described later. If it is judged that lane line based control is possible, the relative position between the lane line and vehicle is detected (S102), and based on this relative position the steering actuator is controlled (S103). In concrete terms, by setting the displacement from the vehicle lane's center (middle between two lane lines) to δ, the steering amount may be determined as the sum of the term proportional to δ and the term proportional to the time variation of δ. On the other hand, if lane line based control is judged to be inappropriate, the distances to the side walls are detected (S104) according to the detection signals from laser radar devices 12, 14, the driver is informed of a message indicating that lane line detection was not possible (S105), after which steering control transfers to that based on the distances to the side walls (S103). Distance to side wall based steering control may be controlled so that the detected distances to the side walls are kept nearly constant. However, due to the influence of noise, for example, the accuracy of the distances to the side walls is generally low compared to lane line detection. Therefore, after the driver has been informed in S105, it is desirable to drive the brake actuator 28 for deceleration, and then perform steering control.

Figure 4:
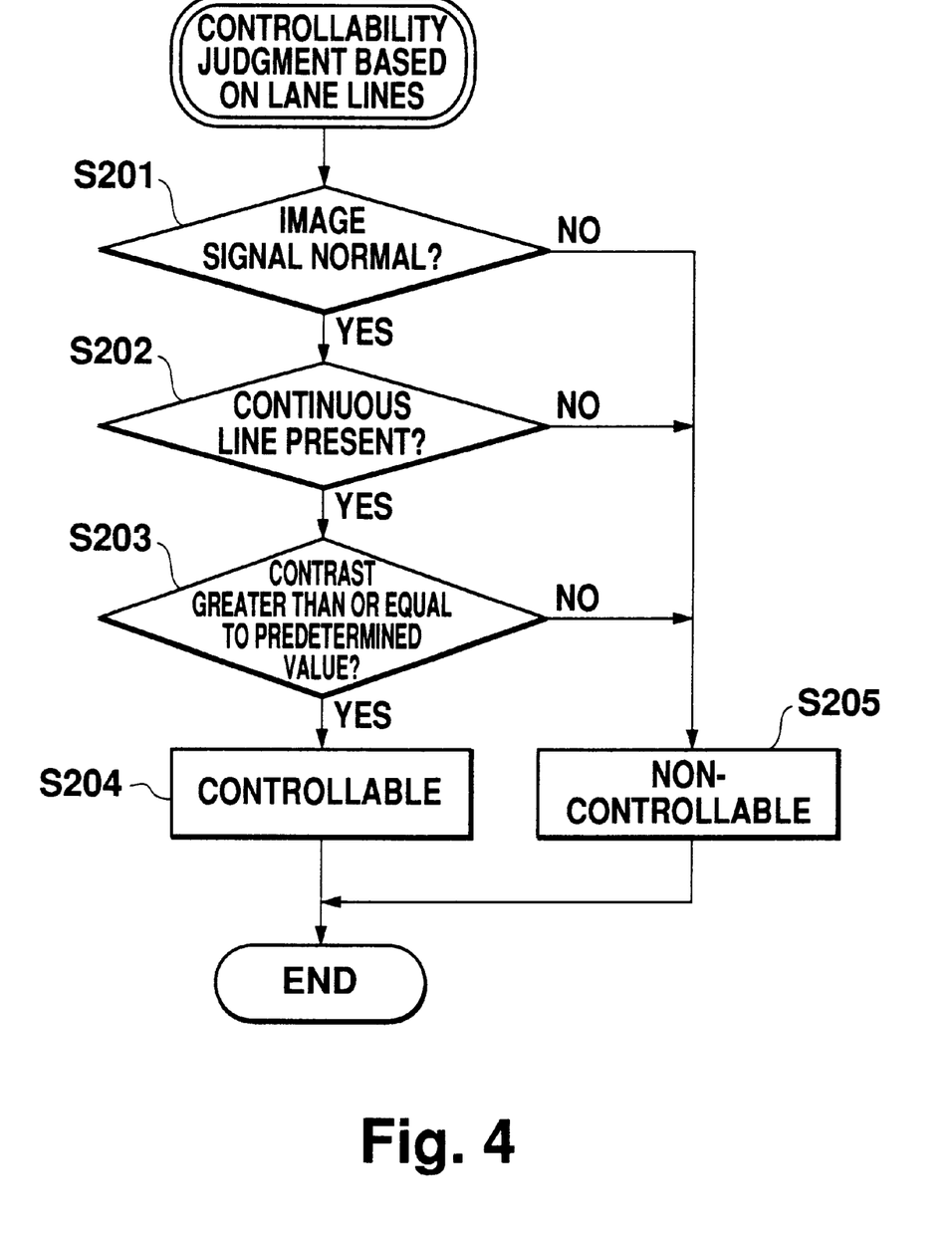
FIG. 4 is a flowchart of a lane-line based controllability judgment process.

FIG. 4 shows the details of the judgment process that is executed in S101 to determine whether or not lane line based control is possible. The vehicle controlling ECU 20 judges whether or not an image signal from CCD camera 16 is normal (S201). In concrete terms, this judgment determines whether or not CCD camera 16 outputs a synchronization signal having a fixed period, or whether or not a signal has a predetermined varying amplitude, and so forth. If the image signal from the CCD camera 16 is normal (or the camera itself is normal), a search is next performed (S202) for a continuous line that can be considered to be a lane line, from within the image. As mentioned earlier, this search can be performed by template matching or edge extraction. If a continuous line exists, a judgment is further made to determine whether or not its contrast is greater than or equal to a predetermined value (S203), and if the contrast is greater than or equal to the predetermined value, the continuous line is judged to be in fact a lane line so that control is possible (S204). In concrete terms, for example, a "control is possible" flag is set to 1. On the other hand, if the image signal is abnormal, a continuous line does not exist, or a continuous line has a contrast that is less than the predetermined value, it is judged that control is impossible (S205) as the accuracy of the lane line detection is lower than the predetermined value (includes the case where lane line detection is quite impossible). In concrete terms, for example, the "control is possible" flag may be set to 0. As described above, the value of the control flag is determined according to the lane line detection accuracy (or reliability), and a judgment is made (S101) to transfer to the process of S102 according to the value of the determined control flag or to the process of S104.

In this manner, when the accuracy of lane line detection is low because the lane line itself is faint or discontinuous, control is automatically switched to that based on the distances to the side walls so as to achieve stable travel control along the lane.

However, in an actual lane, a situation may arise where the existence of an obstacle (slow moving vehicle or stationary object) makes travel along the lane impossible. In such a situation, the laser radar device 10 constantly monitors ahead of the vehicle for obstacles in this embodiment, and if an obstacle is detected, control is performed, such as through lane changes, to automatically evade the obstacle. This lane change process is described in the following.

Figure 5:
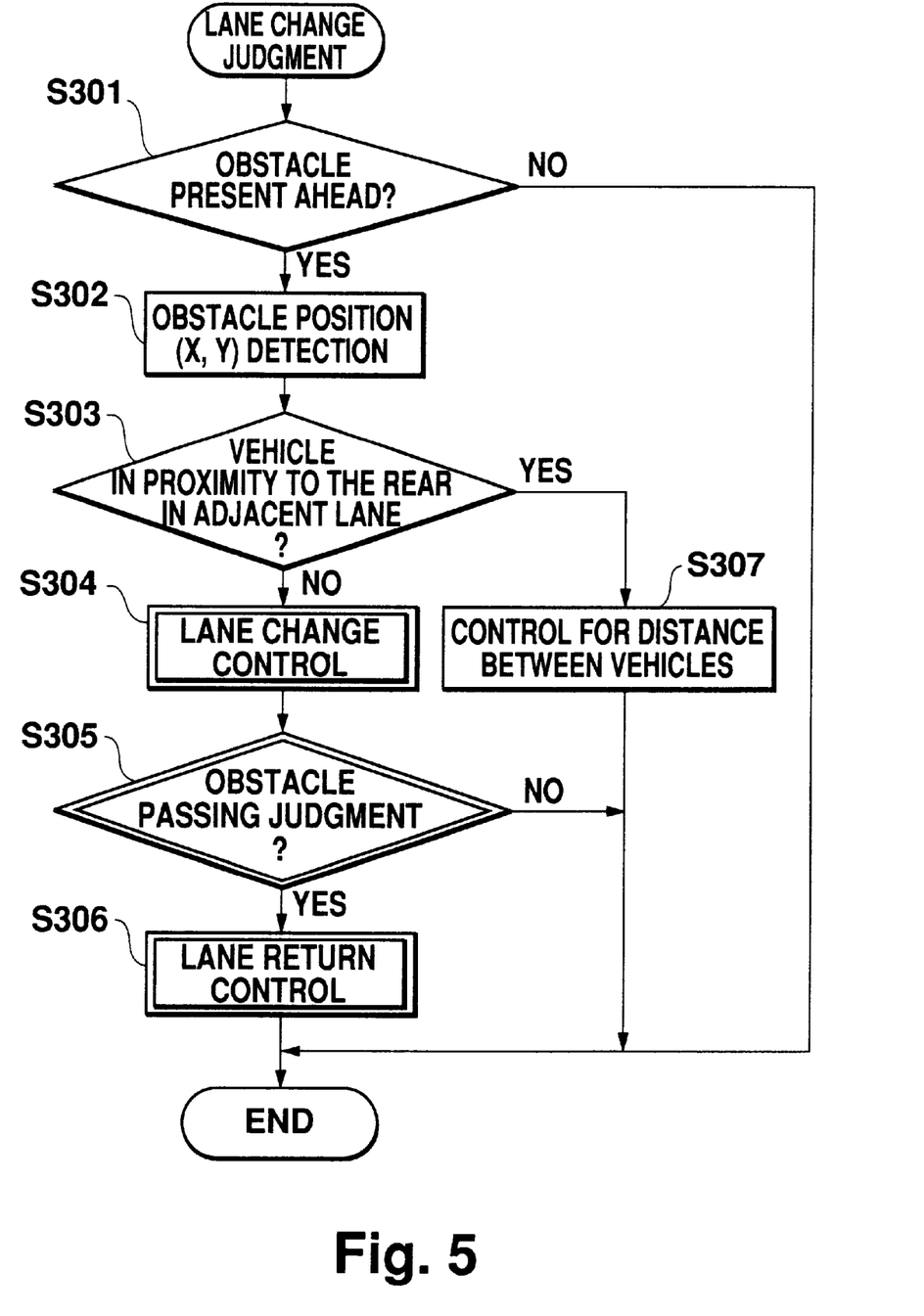
FIG. 5 is a flowchart of a lane change judgment process.

FIG. 5 shows an overall process flowchart for lane changes. First, the vehicle controlling ECU 20 judges (S301) whether or not an obstacle exists ahead based on the detection signal from the laser radar device 10. If an obstacle exists, its position (X, Y) is detected (S302). In concrete terms, laser radar device 10 scans the lane and obtains data for distance r and angle θ, which may be transformed into orthogonal coordinates of (X, Y) with the vehicle position as the origin where the direction of vehicle travel is the y axis and the direction perpendicular to the direction of vehicle travel is the x axis. Next, to judge whether or not a lane change is possible so as to evade an obstacle, a judgment is made (S303) to determine whether or not an approaching vehicle exists in the adjacent lane to the rear. This judgment is performed using image data from the rear-view CCD camera 18, and if an approaching vehicle exists, a lane change is not possible, thus control transfers to that for distance between vehicles (S307) to control the brake actuator 28 so that the obstacle is kept at a safe distance. On the other hand, if an approaching vehicle does not exist, a predetermined lane change control is executed (S304), and a judgment is made to determine whether or not the obstacle was passed (S305). If the obstacle was passed, control transfers to that for a predetermined lane return for returning to the original lane (S306).

Figure 6:
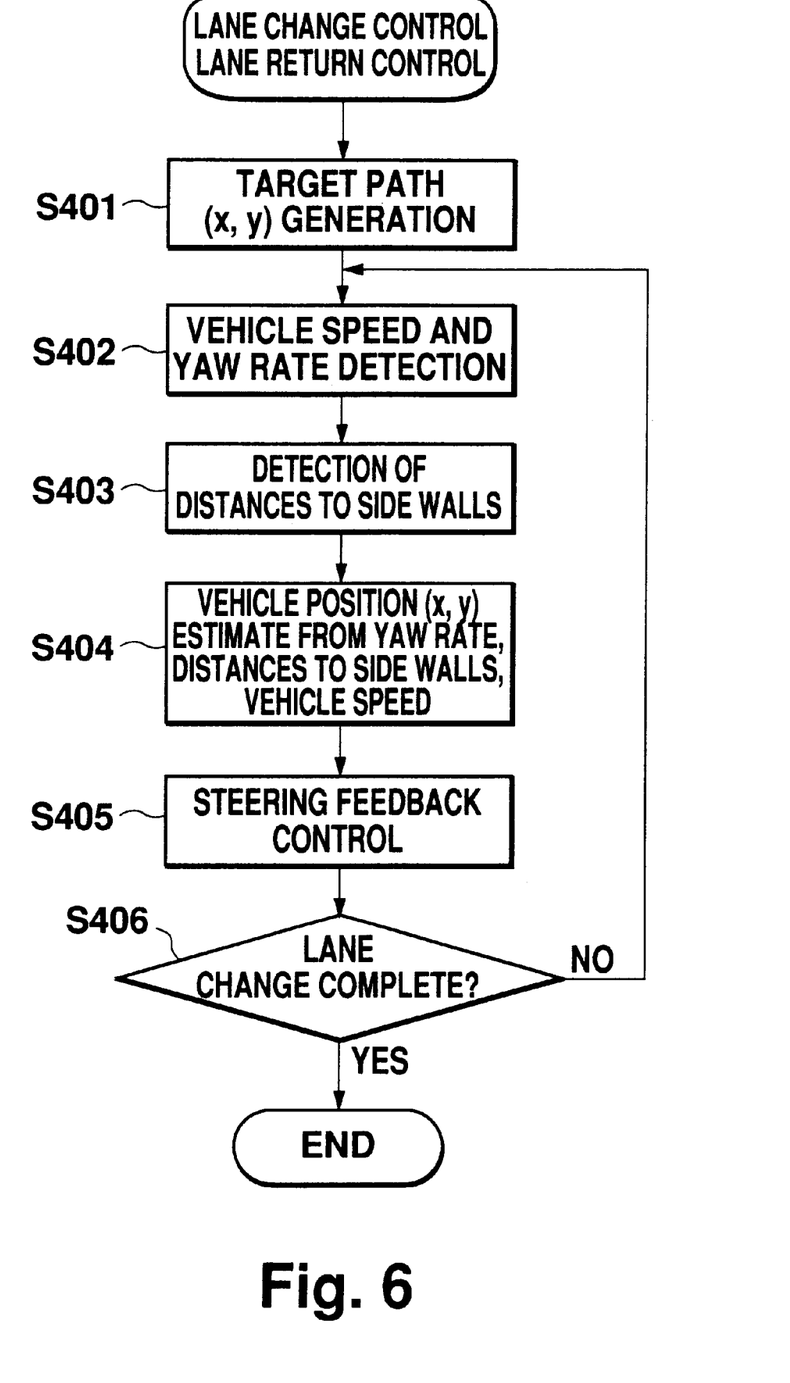
FIG. 6 is a flowchart of lane change control and lane return control.

FIG. 6 shows a process for lane change control of S304 and lane return control of S306. First, the vehicle controlling ECU 20 generates a target path necessary for the lane change (S401). The target path is expressed as (x, y), a horizontal direction position x=x(t) and a direction of travel position y=y(t) in time t, where the current position is (0,0). This target path is a path necessary to smoothly complete the lane change before the obstacle position (X, Y) is reached while maintaining the current vehicle speed during lane change control, and is calculated according to the vehicle speed, lane width, lane curvature, turning performance, and so forth. The lane curvature and lane width can be calculated by extracting the lane line from the image of CCD camera 16 before execution of the lane change. After the target path is calculated, actual steering control is performed to execute the lane change. However, since the direction of the vehicle changes, it may not be possible for the CCD camera 16 to photograph two lane lines. Therefore, during the lane change, the accuracy of the vehicle position detection based on the lane lines is estimated beforehand at a value lower than the predetermined value (impossible), and vehicle controlling ECU 20 switches to data for the distances to the side walls detected by laser radar devices 12, 14 in order to detect the vehicle position before the actual lane change is initiated. In other words, the vehicle speed and yaw rate are detected (S402) and the distances to the side walls are detected (S403) so that the vehicle position (x, y) based on the vehicle speed, yaw rate, and distances to the side walls is detected (S404). Then, the detected vehicle position and the target path are compared, and the steering actuator 24 is controlled through feedback (S405) so that both coincide. Repeating the above process until the lane change completes (S406) enables traveling while evading the obstacle. To return to the original lane, the target path may be set to (−x, y) using the target path calculated in S401. Whether or not the lane change has been completed can be judged by determining whether or not the two lane lines can again be detected by the CCD camera 16, and after completion of the lane change, highly accurate vehicle guided travel based on the lane lines again detected by the CCD camera 16 can be initiated.

In this manner, during lane changes, the vehicle can be guided properly by switching from lane line based steering control to distance to side wall based steering control. However, when detecting the distances to the side walls with the laser radar devices 12, 14, the distances to the side walls on the immediate sides of the vehicle cannot be detected due to the occurrence of a yaw angle in the vehicle, resulting in the detection of oblique distances which are longer than the actual distances. However, when lane width W is known, the horizontal position x of the vehicle can be accurately calculated using x=W·a/(a+b+w) where a and b are the distances detected by laser radar devices 12, 14, and w is the vehicle width.

Furthermore, when evading an obstacle through lane changes and then returning back to the original lane, it is necessary to confirm whether or not the obstacle has been passed. In the present embodiment, the vehicle position is detected during lane changes based on the distances to the side walls, the advantage of which is that the data for the distances to the side walls can be used directly to judge whether or not the obstacle has been passed. The obstacle passing process which becomes a trigger for the lane return process is described in the following.

Figure 7:
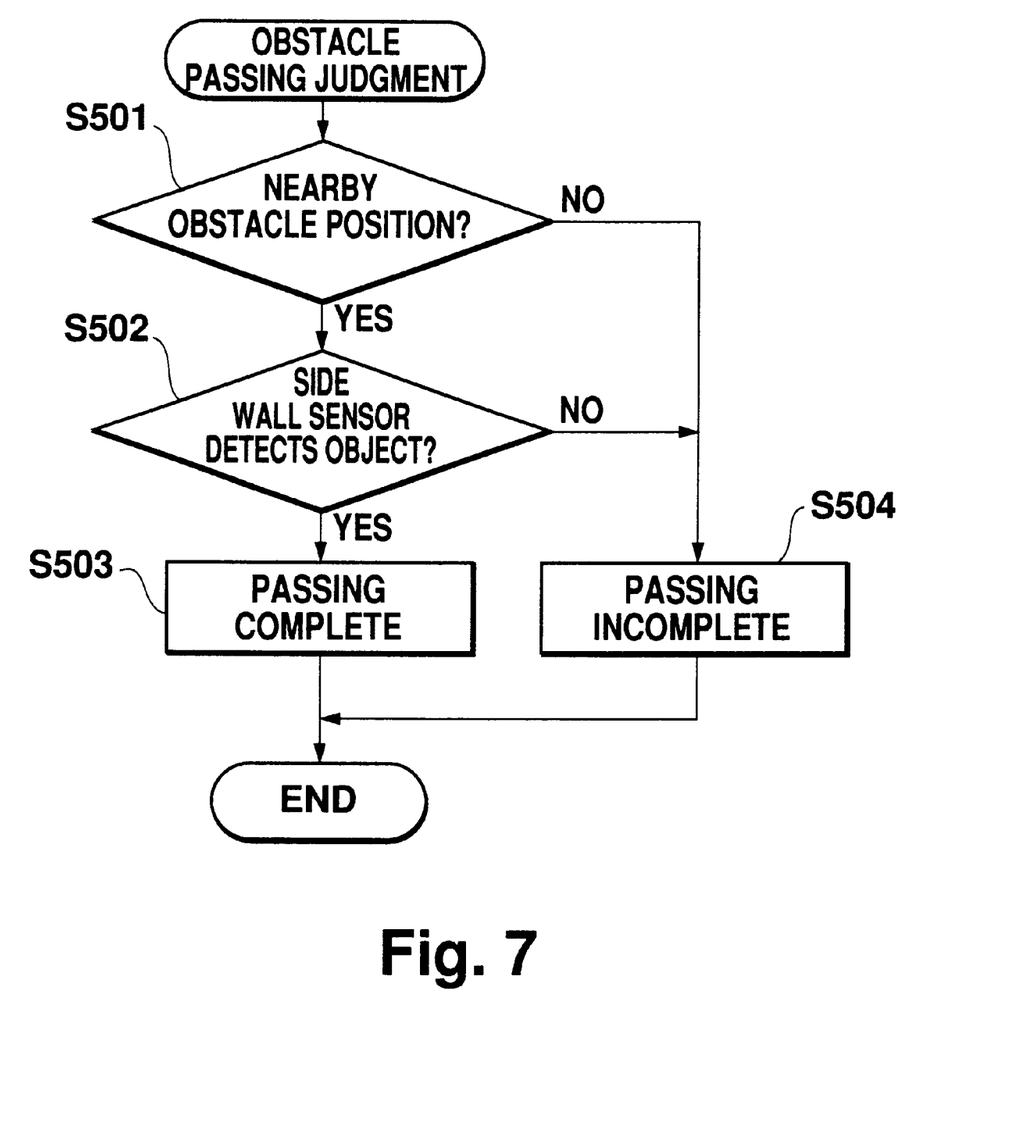
FIG. 7 is a flowchart of an obstacle passing judgment process.
Figure 8A:
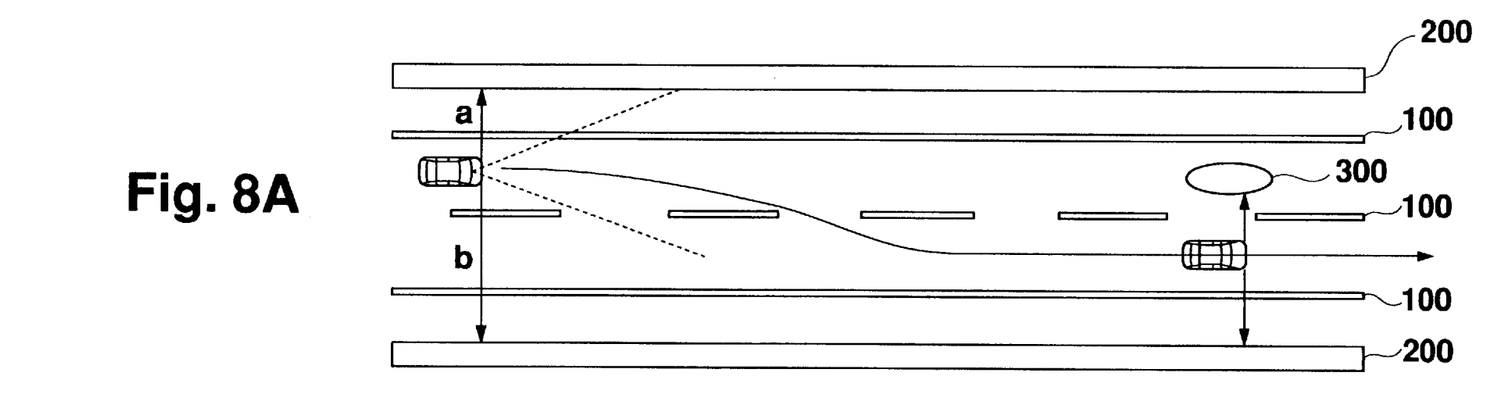
FIG. 8A is a top view showing a vehicle path when an obstacle exists.
Figure 8B:
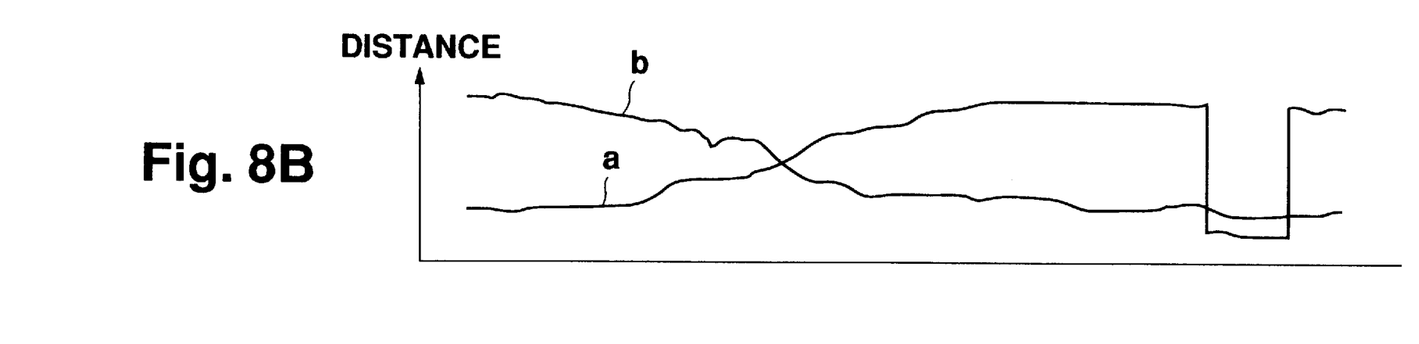
FIG. 8B shows the change in distances from side walls when an obstacle exists.

FIG. 7 shows a flowchart of the obstacle passing process. First, the vehicle controlling ECU 20 judges whether or not the vehicle is in the proximity of the obstacle (S501) by comparing the estimated vehicle position (x, y) with the obstacle position data (X, Y). If the vehicle is in the proximity of the obstacle position, a judgment is made to determine whether or not an object besides the side walls was detected by the laser radar devices 12, 14, which function as side wall sensors (S502). This judgment can be accomplished by determining whether or not the distances to the side walls detected by laser radar devices 12, 14 decrease discontinuously. FIGS. 8A and 8B show the relationship between the path of the vehicle during the lane change and the obstacle, where FIG. 8A shows the path of the vehicle and FIG. 8B shows the distance data detected at that time by laser radar devices 12, 14. Accompanying the lane change, the magnitudes of distance b on the right side of the vehicle that is detected by laser radar device 12 and distance a on the left side of the vehicle that is detected by laser radar device 14 change, after which distance a on the left side of the vehicle suddenly decreases because of an obstacle 300. In other words, at the position of obstacle 300, laser radar device 14 detects the distance not to the side wall 200 but to the obstacle 300. Therefore, it can be judged that obstacle 300 is being passed when distance data a suddenly decreases, and that obstacle 300 has been passed when distance data a returns to the original distance value. In the manner described above, when it has been judged that passing has been completed, a "passing complete" flag is set (S503), and when passing has not been completed, the flag is not set (S504). The value of the passing complete flag may be checked to determine whether or not to initiate the lane return process.

As described above, the travel control in this embodiment automatically transfers to that based on the distances to the side walls when the lane lines cannot be detected by the CCD camera at positions where the lane lines are faint or discontinuous or during lane changes, so as to eliminate the necessity of switching each time to manual driving operations by the driver, thus enabling the continuation of smooth automatic travel. Furthermore, when obstacle evasion has completed through lane changes, it is also possible to quickly return back to the original lane.

In this embodiment, an example where the vehicle evades an obstacle through lane changes was given. However, depending on the position or size of the obstacle, there are also situations where evasion is possible without changing lanes. For example, if the obstacle is not too large, there are situations where the obstacle can be evaded by only a slight steering adjustment. Also, in such situations, when, for example, steering is performed such that the vehicle crosses over a lane, it is possible that the two lane lines cannot be detected by CCD camera 16, so that steering control may be switched to that based on the distances to the side walls that were detected by laser radar devices 12, 14 at a point when the target path was calculated. Naturally, for a straight lane, it is also possible for steering control based on the lane lines to be continued while the two lane lines can be detected by CCD camera 16, then transferred to steering control based on the distances to the side walls from a point when the lane lines cannot be detected. In either case, the main point of this invention lies in performing lane line detection and side wall detection in parallel and in performing travel control by switching between these two types of detection according to the detection accuracy, thus different varieties of usage are possible within the scope of this invention.

While there has been described what are at present considered to be a preferred embodiment of the invention, it will be understood that various modifications may be made thereto, and it is intended that the appended claims cover all such modifications as fall within the true spirit and scope of the invention.

What is claimed is:

1. An automatic travel controlling device comprising:
    first detecting means for detecting a vehicle position by detecting a lane line;
    second detecting means for detecting the vehicle position by detecting the distance to a side wall of a road;
    evaluating means for evaluating a detection accuracy of said first detecting means; and
    controlling means for executing, based on the detection accuracy of said first detecting means, steering control based on the vehicle position that was detected by one of said first detecting means and second detecting means, wherein said evaluating means estimates a future detection accuracy based on a future travel path of the vehicle, said future travel path is a travel path accompanying a lane change by the vehicle, said evaluating means estimates said future detection accuracy lower than a predetermined value, and said controlling means executes, when said future detection accuracy is lower than the predetermined value, steering control based on the vehicle position that was detected by said second detecting means.

2. A device according to claim 1 wherein said controlling means executes, when the detection accuracy of said first detecting means is lower than a predetermined value, steering control based on the vehicle position that was detected by said second detecting means.

3. A device according to claim 1 wherein said first detecting means includes a photographing means for photographing the road ahead of the vehicle, and said evaluating means evaluates said detection accuracy based on a lane line image within a road image that was output from said photographing means.

4. A device according to claim 1 wherein said controlling means executes steering control based on the vehicle position that was detected by said first detecting means when the detection accuracy by said evaluating means subsequent to the start of a lane change has returned to the detection accuracy prior to the lane change.

* * * * *